(12) United States Patent
Sauvlet et al.

(10) Patent No.: US 8,360,183 B2
(45) Date of Patent: Jan. 29, 2013

(54) METHOD FOR OPERATING A DRIVE SYSTEM FOR A MOTOR VEHICLE

(75) Inventors: Nils Sauvlet, Rutesheim (DE); Joerg-Michael Birkhold, Gerlingen (DE); Martin Fuechtner, Stuttgart (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 169 days.

(21) Appl. No.: 13/020,441

(22) Filed: Feb. 3, 2011

(65) Prior Publication Data

US 2011/0203860 A1 Aug. 25, 2011

(30) Foreign Application Priority Data

Feb. 20, 2010 (DE) .......................... 10 2010 008 726

(51) Int. Cl.
*B60W 10/06* (2006.01)

(52) U.S. Cl. ................................ 180/65.28; 180/65.265

(58) Field of Classification Search ............... 180/65.27, 180/65.25, 65.21, 65.225, 65.22, 197, 65.28, 180/65.265; 477/3, 5, 15; 930/930, 942, 930/946

See application file for complete search history.

(56) References Cited

U.S. PATENT DOCUMENTS

| | | | | |
|---|---|---|---|---|
| 5,303,794 A * | 4/1994 | Hrovat et al. | ................. | 180/197 |
| 6,490,945 B2 * | 12/2002 | Bowen | .......................... | 903/946 |
| 6,499,370 B2 * | 12/2002 | Bowen | .......................... | 74/330 |
| 6,634,247 B2 | 10/2003 | Pels et al. | | |
| 6,712,734 B1 * | 3/2004 | Loeffler | ............................. | 477/5 |
| 7,464,616 B2 | 12/2008 | Leibbrandt et al. | | |
| 7,476,176 B2 * | 1/2009 | Ibamoto et al. | ................. | 477/15 |
| 7,604,565 B2 * | 10/2009 | Lee et al. | ........................... | 477/3 |
| 7,784,573 B2 * | 8/2010 | Kluge et al. | ............... | 180/65.22 |
| 7,950,302 B2 * | 5/2011 | Burgardt et al. | ................ | 74/331 |
| 8,011,460 B2 * | 9/2011 | Hobel | ........................ | 180/65.22 |
| 8,182,388 B2 * | 5/2012 | Gumpoltsberger | ........... | 475/330 |
| 8,251,866 B2 * | 8/2012 | Kaltenbach | ...................... | 477/5 |

FOREIGN PATENT DOCUMENTS

| | | |
|---|---|---|
| DE | 101 33 695 | 3/2002 |
| DE | 10 2007 050 659 | 4/2009 |
| EP | 1 714 817 | 4/2005 |

* cited by examiner

*Primary Examiner* — Hau Phan

(74) *Attorney, Agent, or Firm* — Gerald E. Hespos; Michael J. Porco

(57) ABSTRACT

A vehicle has an internal combustion engine, an electric drive device and a transmission with two component transmissions that can be selected simultaneously. Torque can be transmitted from the electric drive device and/or the internal combustion engine to at least one axle of the vehicle, and a torque can be transmitted from the axle to the electric drive device and/or the internal combustion engine. The internal combustion engine is adjusted from a deactivated state to an energized state. Torque is transmitted to the internal combustion engine by the axle and/or the electric drive device via one of two shifting elements to increase rotational speed of the internal combustion engine. The internal combustion engine is adjusted to a target rotational speed via one of the shifting elements. The connection between the internal combustion engine and the axle is produced via one of the shifting elements upon reaching the target rotational speed.

10 Claims, 4 Drawing Sheets

METHOD FOR OPERATING A DRIVE SYSTEM FOR A MOTOR VEHICLE

CROSS-REFERENCE TO RELATED APPLICATION

This application claims priority under 35 USC 119 to German Patent Application No. 10 2010 008 726.2, filed on Feb. 20, 2010, the entire disclosure of which is incorporated herein by reference.

BACKGROUND OF THE INVENTION

1. Field of the Invention

The invention relates to a method for operating a drive system for a motor vehicle that has an internal combustion engine, a transmission and an electric drive device.

2. Description of the Related Art

EP 1 714 817 A1 discloses a hybrid double-clutch transmission that is connected to the internal combustion engine and has at least two component transmissions on which different transmission ratios can be respectively selected at the same time. The transmission can be operated by various methods.

In such drive systems, various situations occur in such drive systems in which the internal combustion engine has to be adjusted from its deactivated state to its energized state in which the internal combustion engine drives the drive axle and therefore the wheels of the motor vehicle. The internal combustion engine is deactivated when the motor vehicle is operated exclusively with the electric drive device, or in a coasting mode where the motor vehicle coasts exclusively on the basis of the previously acquired momentum. However, the internal combustion engine must be restarted near the end of the inactive state. This restarting should occur as comfortably as possible, but at the same time also occur dynamically. The rotational speed of the internal combustion engine should be adjusted during the starting process by means of open-loop and/or closed-loop control to a target or rotational speed that is present at the transmission input. Additionally, rotational speed of the internal combustion engine should be adjusted during the starting process should ensure that the motor vehicle does not carry out a change in acceleration that does not correspond to the driver's request. For example, the motor vehicle may coast toward a traffic light that is at red but is switched over to green. Thus, a driver's request may be to achieve the highest possible acceleration from the coasting state. This leads to the requirement that the re-starting of the internal combustion engine should occur as dynamically as possible, i.e. within the shortest possible time.

Furthermore, the rotational speed of the transmission and the shifting elements assigned to the transmission may not be high enough at low speeds of the motor vehicle to start the internal combustion engine in a sufficiently comfortable way. This occurs because a reversal of torque would continuously occur at the shifting elements as a result of the high degree of rotational irregularity of the internal combustion engine.

The object of the invention is to provide a method for operating a drive system for a motor vehicle having an internal combustion engine, a transmission with at least two component transmissions, and an electric drive device. The method is to enable the internal combustion engine to be adjusted from its deactivated state to its energized state in a way that is as comfortable as possible and at the same time as dynamic as possible.

SUMMARY OF THE INVENTION

In certain cases, the electric drive device transmits a torque to the internal combustion engine via one of the shifting elements to start said internal combustion engine. According to the invention, the rotational speed of the internal combustion engine is adjusted to a target rotational speed, preferably of the transmission input, during this starting process. Thus, it is possible to ensure by means of the open-loop or closed-loop control of the shifting element that the motor vehicle does not carry out a change in acceleration that does not correspond to the driver's request. At the same time it is possible in this way to carry out the starting process in a dynamic fashion, i.e. in particular in a short time and, if appropriate, to a high rotational speed, when necessary.

The solution of the invention permits the internal combustion engine to be started or re-started after a purely electric operating mode or after a coasting mode with just one electric drive device. As a result, there is a saving both in costs and weight, which ultimately makes lower fuel consumption possible.

The transmission preferably has two shifting elements and may be a double-clutch transmission with two component transmissions. The different rotational speeds that are present at the two shifting elements due to the different transmission ratios are used advantageously so that the rotational speed of the internal combustion engine is increased via the one shifting element, and the connection between the internal combustion engine and the drive axle is produced with the other shifting element. As a result the internal combustion engine can take over the function of driving the motor vehicle after a very short starting phase. A reduction in the drive torque used for starting the internal combustion engine by the electric drive device can be achieved as a function of the available transmission ratios of the component transmissions depending on whether the electric drive device is connected to the internal combustion engine directly or via the two component transmissions.

The internal combustion engine may be started by the shifting element assigned to the component transmission that has the relatively low transmission ratio, and is adjusted to the target rotational speed by the shifting element assigned to the component transmission that has the relatively low transmission ratio. The connection between the internal combustion engine and the drive axle then is produced via the shifting element assigned to the component transmission the has the relatively high transmission ratio. Starting the internal combustion engine with the shifting element assigned to the component transmission that has the relatively small transmission ratio enables the abovementioned reduction in starting torque with respect to the drive shaft of the electric drive device. As a result, a relatively low torque of the electric drive device has to be used to start the internal combustion engine, wand a relatively large portion of the torque of the electric drive device is available for driving the motor vehicle. The connection of the drive axle to the internal combustion engine is realized in this case by the shifting element that has not been used to accelerate the internal combustion engine.

As an alternative, the internal combustion engine may be started by the shifting element assigned to the component transmission that has the relatively high transmission ratio, and is adjusted to the target rotational speed by the shifting element assigned to the component transmission with the relatively low transmission ratio. Connection between the internal combustion engine and the drive axle then is produced via the shifting element assigned to the component transmission with the relatively high transmission ratio. This procedure is applied for re-starting processes from the coasting mode, i.e. when the electric drive device has not been operated.

As a further alternate, the internal combustion engine may be started by the shifting element assigned to the component transmission that has the relatively high transmission ratio, and is adjusted to the target rotational speed by the shifting element assigned to the component transmission with the relatively high transmission ratio. The connection between the internal combustion engine and the drive axle then is produced via the shifting element assigned to the component transmission with the relatively low transmission ratio.

The connection to the internal combustion engine via the shifting element assigned to the component transmission with the relatively low transmission ratio may be interrupted before the rotational speed of the component transmission with the relatively low transmission ratio is reached, and the shifting element assigned to the component transmission with the relatively high transmission ratio may be connected to the internal combustion engine after the rotational speed of the component transmission with the relatively low transmission ratio has been exceeded. This avoids a torque reversal, which is possible as a result of the rotational speed of the shifting element assigned to the component transmission with the relatively low transmission ratio being exceeded.

The connection to the internal combustion engine via the shifting element assigned to the component transmission with the relatively low transmission ratio preferably is interrupted before the component transmission with the relatively low transmission ratio reaches the rotational speed. Additionally, the shifting element assigned to the component transmission with the relatively high transmission ratio is connected to the internal combustion engine after the rotational speed of the component transmission with the relatively low transmission ratio has exceeded the rotational speed. As a result, the rotational speed of the internal combustion engine is adjusted starting from a relatively high rotational speed, which leads to a particularly comfortable transfer of the drive of the motor vehicle to the internal combustion engine.

The torque transmitted to the engine by at least one of the shifting elements preferably is modulated by at least one actuator assigned to the respective shifting element to increase the comfort for the driver and the passengers of the motor vehicle.

An additional starting device may be used to start the internal combustion engine at speeds of the motor vehicle below a limiting speed, and that the internal combustion engine is started via the drive axle at speeds of the motor vehicle above the limiting speed. The kinetic energy of the motor vehicle can be used to start the internal combustion engine starting from a certain limiting speed. However, starting occurs via the electric drive device below this limiting speed to avoid adverse effects on comfort.

Closed-loop and/or open-loop control of the electric drive device preferably is performed by a closed-loop and/or open-loop control device to avoid undesired changes in acceleration for the motor vehicle.

The internal combustion engine may be adjusted to a higher torque than a desired torque that has been set via an accelerator pedal to increase the dynamics of the starting process of the internal combustion engine.

An exemplary embodiment of the invention is explained in more detail in the following description and drawings.

DETAILED DESCRIPTION OF THE PREFERRED EMBODIMENT

Figure 1:
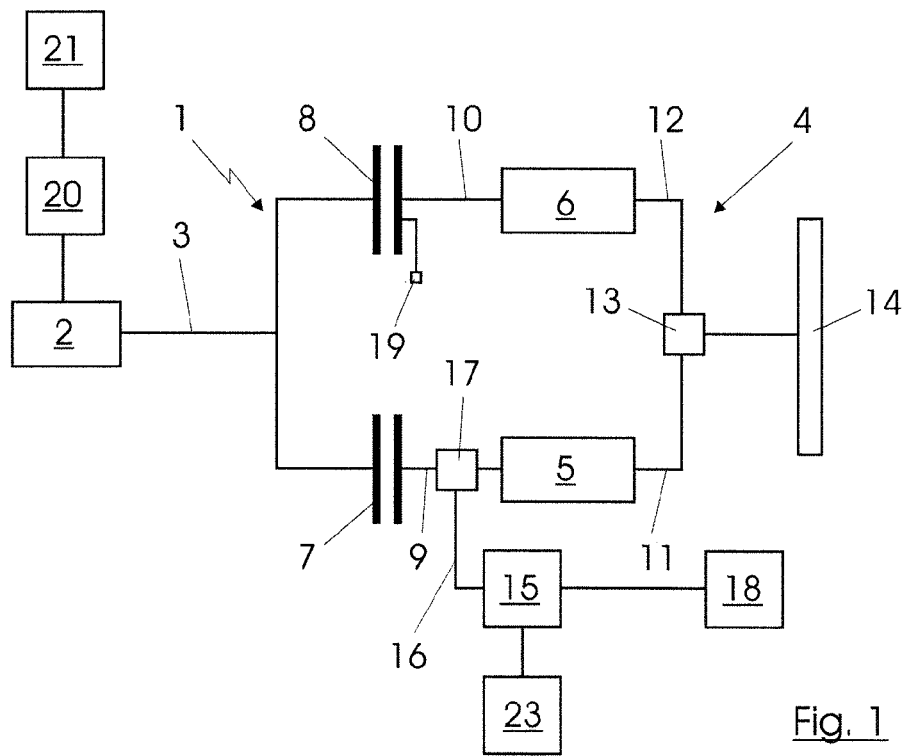
FIG. 1 is a schematic view of a second configuration of the drive system for the motor vehicle.

A drive system 1 for a motor vehicle, which is not illustrated in its entirety, has an internal combustion engine 2 connected via an engine output shaft or connecting shaft 3 to a transmission 4. The transmission 4 has two component transmissions, specifically first and second component transmissions 5 and 6, as a result of which two different transmission ratios can be selected simultaneously at the transmission 4 in a manner known per se. The transmission 4 has a first shifting element 7 assigned to the first component transmission 5, and a second shifting element 8 assigned to the second component transmission 6. The two shifting elements 7 and 8 are embodied in the present case as clutches, but other suitable devices with which a connection can be produced between the respective component transmission 5 or 6 and the connecting shaft 3 of the internal combustion engine 2 would also be conceivable. The clutches can be dry clutches or wet clutches. In the present case, the transmission 4 therefore is a double-clutch transmission and may be of a known design. Hence, there is no need to make explicit reference to certain functions of the double-clutch transmission.

A first input shaft 9 connects the first component transmission 5 to the first shifting element 7 and a second input shaft 10 connects the second component transmission 6 to the second shifting element 8. Furthermore, the two component transmissions 5 and 6 are connected to respective first and second output shafts 11 and 12 that are connected to one another and to a drive axle 14 of the motor vehicle via a connecting device 13, which may be a differential.

Figure 2:
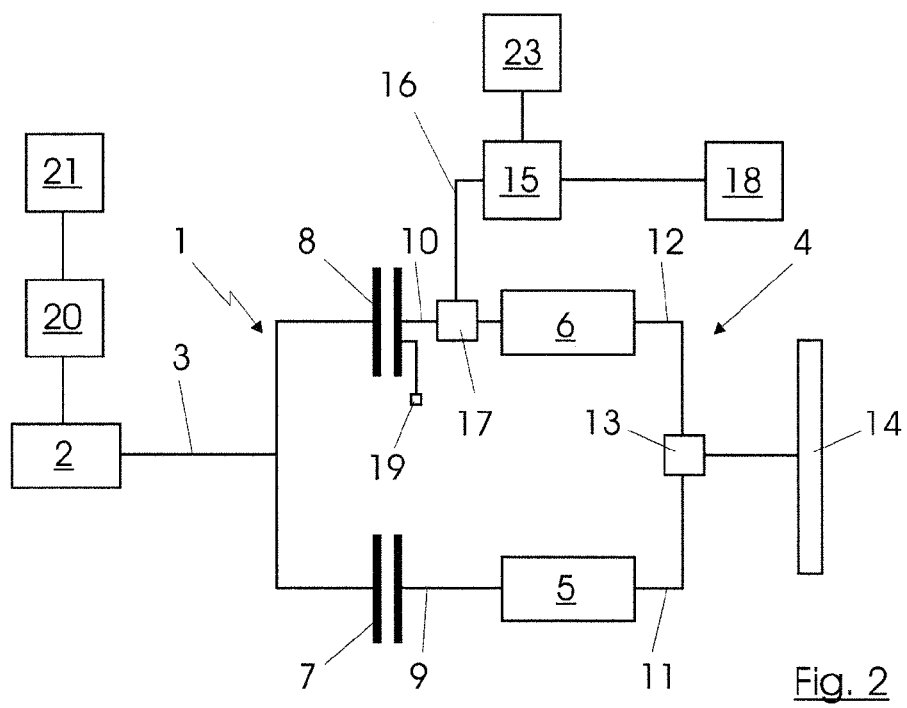
FIG. 2 is a rotational speed/time diagram in a first method sequence for starting the internal combustion engine.

The drive system 1 is a hybrid drive system that has the internal combustion engine 2 and an electric drive device 15, which, in FIG. 1, is connected to the first input shaft 9 of the first component transmission 5 via a connecting shaft 16 and an intermediate transmission 17. Alternatively, the electric drive device 15 can be connected to the second input shaft 10, and to the second component transmission 6 and the second shifting element 8, as illustrated in FIG. 2. The electric drive device 15 also could be connected selectively to the first input shaft 9 or the second input shaft 10, for example via a suitable clutch device. The electric drive device 15 preferably is an electric machine that can be operated as an electric motor or as a generator.

The transmission 4 enables six gear speeds, i.e. six different transmission ratios from the internal combustion engine 2 or the electric drive device 15 to the drive axle 14. In the present case, which is purely exemplary, the gear speeds 2, 4 and 6 can be selected in the first component transmission 5, and the gear speeds 1, 3 and 5 can be selected in the second component transmission 6. Of course, the transmission 4 can have more or fewer than the specified six different transmission ratios. Furthermore, a transmission 4 with more than two component transmissions is also conceivable.

The electric drive device 15 can be operated in a regeneration mode to feed electric current into a battery 18 that is connected to the electric drive device 15. Of course, instead of the battery 18, other devices can be used for storing the current generated by the electric drive device 15.

The internal combustion engine 2 and the electric drive device 15 each are connected to the transmission 4 in such a way that a torque can be transmitted from the electric drive device 15 and/or from the internal combustion engine 2 to the drive axle 14 of the motor vehicle. Conversely, torque can be transmitted from the drive axle 14 to the electric drive device 15 and/or the internal combustion engine 2. In the method described below, the internal combustion engine 2 will be adjusted from a non-energized or deactivated state to an energized state to take over the function of driving the drive axle 14. Thus, a torque is transmitted from the drive axle 14 and/or the electric drive device 15 to the internal combustion engine 2 via one of the two shifting elements 7 or 8 to increase the rotational speed of the internal combustion engine 2 and to carry out the starting process of the internal combustion engine 2. The internal combustion engine 2 is adjusted to a target rotational speed via one of the two shifting elements 7 or 8, and when the target rotational speed is reached the connection between the internal combustion engine 2 and the drive axle 14 is produced via one of the two shifting elements 7 or 8. As a result, the internal combustion engine 2 can be used to drive the drive axle 14 and therefore the motor vehicle after this connection has been produced. In this way, the re-starting of the internal combustion engine 2 can occur in a way that is comfortable for the driver of the motor vehicle and also dynamic, i.e. in a very short time, in appropriate situations to achieve a particularly high acceleration.

The drive system 1 of FIG. 1 has the electric drive device 15 and the associated battery 18 assigned to the first component transmission 5 via the connecting shaft 16 and the intermediate transmission 17. The first component transmission 5 has engaged a gear speed with a high transmission ratio of the internal combustion engine 2 with respect to the drive axle 14, i.e. a low gear speed. Additionally, the second component transmission 6 has engaged a gear speed with a relatively low transmission ratio, i.e. a relatively high gear speed. When the motor vehicle is coasting, the internal combustion engine 2 is started via the second shifting element 8, which is assigned to the second component transmission 6 that has the relatively low transmission ratio and that rotates at a specific rotational speed. The second shifting element 8 also adjusts the internal combustion engine 2 to the desired target rotational speed. Thus, the second shifting element 8 transmits a torque to the internal combustion engine 2. The first shifting element 7, which is assigned to the component transmission 5 and has the relatively high transmission ratio, then produces the power flux from the internal combustion engine 2 to the drive axle 14. The starting torque, i.e. the drive torque used by the electric drive device 15 to start the internal combustion engine 2, is reduced with respect to the connecting shaft 16 of the electric drive device 15 by starting the internal combustion engine 2 via the second shifting element 8. A torque necessary for starting the internal combustion engine 2 is set at the second shifting element 8 and this setting of the torque can take place in a shaped fashion. Thus, it is possible to modulate the torque profile in accordance with a certain starting strategy. For this purpose, control devices, such as hydraulic or electromechanical actuators, can assigned to the two starting elements 7 and 8 for setting any desired torques at the starting elements 7 and 8. This torque is reduced before the rotational speed of the internal combustion engine 2 reaches the rotational speed of the second input shaft 10 of the second shifting element 8 to prevent a reversal of direction of the torque flux at the second shifting element 8. The revving up of the internal combustion engine 2 can be accelerated by setting a torque at the first shifting element 7 whose torque profile can be modulated. Such a torque is reduced, in a similar way to that described above with respect to the second shifting element 8 before the rotational speed of the internal combustion engine 2 reaches the rotational speed of the first input shaft 9 to bring about a reversal of direction of the torque flux at the first shifting element 7. The internal combustion engine 2 then is adjusted to the desired target rotational speed, which preferably can take place via a target rotational speed closed-loop control process of the internal combustion engines 2. To increase the dynamics at one of the two shifting elements 7 or 8, a torque can be set as soon as the internal combustion engine 2 outputs a positive torque and the rotational speed of the internal combustion engine 2 is higher than the rotational speed of the second input shaft 10. The torque set at one of the shifting elements 7 or 8, can be modulated in accordance with an adjustment strategy, for example by the current torque of the internal combustion engine 2 being pilot-controlled to reach the desired target rotational speed. The transfer of torque to the first shifting element 7 takes place when the desired target rotational speed of the internal combustion engine 2 is reached, i.e. the second shifting element 8 is opened and the first shifting element 7 is closed to produce a connection between the internal combustion engine 2 and the drive axle 14 via the first component transmission 5. A certain tolerance range may be taken into account in the process. At the start of the transfer of torque to the first shifting element 7, an additional torque can be pilot-controlled at the second shifting element 8 to avoid harmonics of the rotational speed of the internal combustion engine 2 or to increase the starting dynamics thereof, since in this way a torque can be built up more quickly at the internal combustion engine 2.

Figure 3:
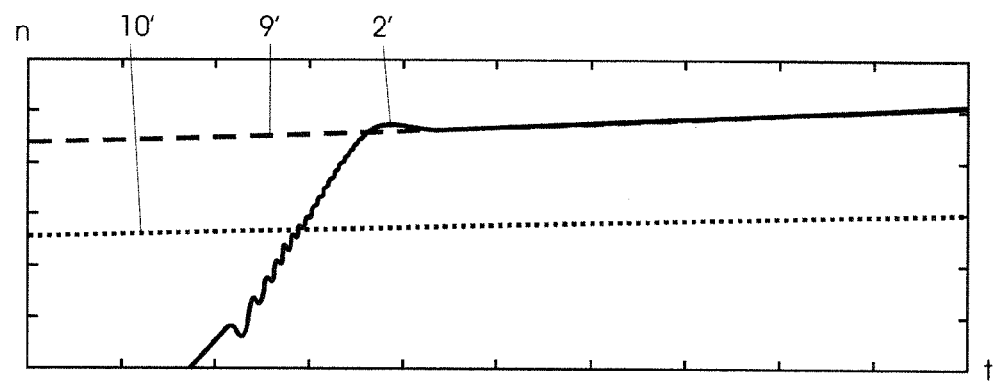
FIG. 3 is a rotational speed/torque diagram in a first method sequence for starting the internal combustion engine.
Figure 4:
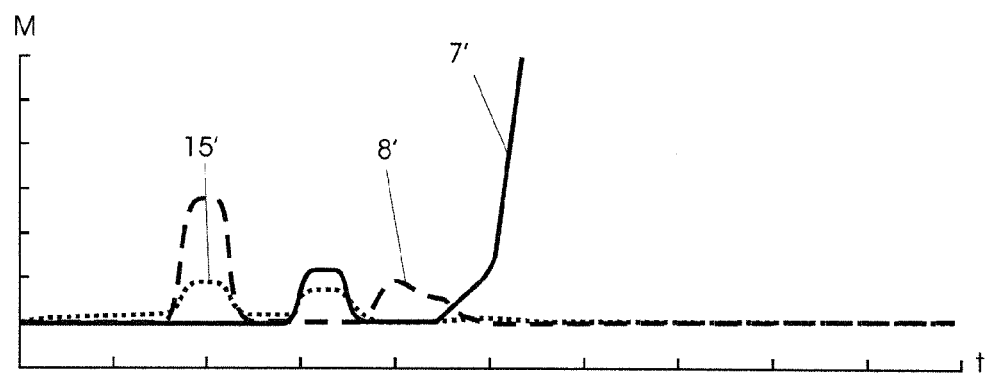
FIG. 4 is a rotational speed/time diagram in a second method sequence for starting the internal combustion engine.

FIGS. 3 and 4 represent the strategy described above. In FIG. 3, the rotational speed of the internal combustion engine 2 is represented by the reference symbol 2', the rotational speed of the first input shaft 9 is represented by the reference symbol 9', and the rotational speed of the second input shaft 10 is represented by the reference symbol 10', all plotted against the time. In FIG. 4, the reference symbol 7' illustrates the torque present at the first shifting element 7, the reference symbol 8' represents the torque present at the second shifting element 8, and the reference symbol 15' represents the torque that is output by the electric drive device 15, all plotted against the time.

The method is carried out in reverse if a gear speed with a low transmission ratio of the internal combustion engine 2 with respect to the drive axle 14, i.e. a high gear speed, is engaged in the first component transmission 5, and if a gear speed with a high transmission ratio, i.e. a relatively low gear speed, is engaged in the second component transmission 6, i.e. instead of the shifting element 7 the shifting element 8 is used, and vice versa. As a result, it is not necessary to perform a shifting process before the internal combustion engine 2 is re-started. The variant which is to be applied can be selected by means of a control unit (not illustrated).

Another variant of the method for re-starting the internal combustion engine 2 when the motor vehicle is coasting involves starting the internal combustion engine 2 via the first shifting element 7, which is assigned to the first component transmission 5 which has the relatively high transmission ratio. The second shifting element 8, which is assigned to the second component transmission 6 which has the relatively low transmission ratio, then adjusts the internal combustion engine 2 to the target rotational speed. The power flux from the internal combustion engine 2 to the drive axle 14 or the connection between the internal combustion engine 2 and the drive axle 14 then is produced via the first shifting element 7, which is assigned to the first component transmission 5. This procedure is suitable for re-starting processes from the coasting mode. In particular, a torque necessary for starting the internal combustion engine 2 is set at the first shifting element 7, and, as described above, can take place in a shaped fashion so that the torque profile can be modulated in accordance with a certain starting strategy. In a similar way, the torque is reduced completely before the rotational speed of the internal combustion engine 2 reaches the rotational speed of the second input shaft 10 of the second component transmission 6 to prevent a reversal of direction of the torque flux at the second shifting element 8. In this case, the revving up of the internal combustion engine 2 optionally can be accelerated due to the fact that a torque which, if appropriate, is modulated by a starting strategy, is set at the first shifting element 7. This torque preferably is reduced before the rotational speed of the internal combustion engine 2 reaches the rotational speed of the first input shaft 9 of the first component transmission 5 to prevent a reversal of direction of the torque flux at the first shifting element 7. The desired target rotational speed of the internal combustion engine 2 in turn is implemented by a target rotational speed closed-loop control process of the internal combustion engine 2. To increase the dynamics, a torque is set at one of the two shifting elements 7 or 8 as soon as the internal combustion engine 2 outputs a positive torque and the rotational speed of the internal combustion engine 2 is higher than the rotational speed of the second input shaft 10. This torque set at one of the two shifting elements 7 or 8 also can be modulated by a corresponding adjustment strategy, as described above. The torque is transferred to the first shifting element 7, if the desired target rotational speed of the internal combustion engine 2 and, if appropriate, a desired target rotational speed gradient are reached. Thus, the internal combustion engine 2 is connected to the drive axle 14 via the first component transmission 5. A certain tolerance range also can be taken into account. Additionally, to avoid harmonics of the rotational speed of the internal combustion engine 2 and/or to increase the starting dynamics thereof, it is possible at the start of this transfer of torque to pilot-control an additional torque at the second shifting element 8 to build up torque at the internal combustion engine 2 more quickly.

Figure 5:
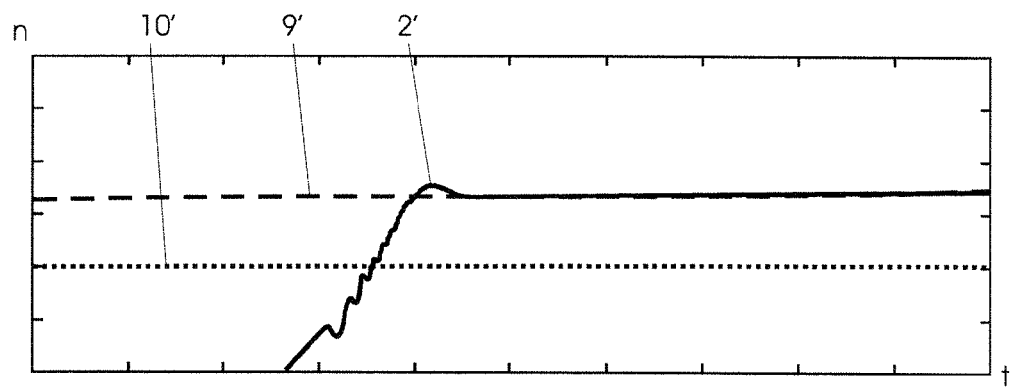
FIG. 5 is a rotational speed/torque diagram in a second method sequence for starting the internal combustion engine.
Figure 6:
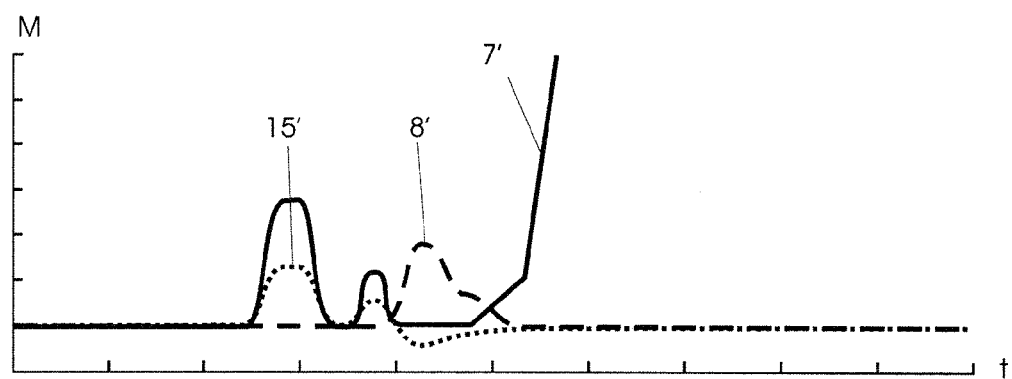
FIG. 6 is a diagram which shows the sequence of part of the method according to the invention.

FIGS. 5 and 6 show this alternative starting strategy similarly to the illustrations in FIGS. 3 and 4. In FIG. 5 the reference symbol 2' represents the rotational speed of the internal combustion engine 2, the reference symbol 9' represents the rotational speed of the first input shaft 9, and the reference symbol 10' represents the rotational speed of the second input shaft 10, all plotted against the time. In FIG. 6, in a way analogous to FIG. 4, the reference symbol 7' represents the torque present at the first shifting element 7, the reference symbol 8' represents the torque which is present at the second shifting element 8, and the reference symbol 15' represents the torque which is output by the electric drive device 15, all plotted against the time.

The internal combustion engine 2 can be started by the shifting element 7 assigned to the component transmission 5 which has the relatively high transmission ratio and to adjust the internal combustion engine 2 to the target rotational speed by the shifting element 8 assigned to the component transmission 6 which has the relatively low transmission ratio. The connection between the internal combustion engine 2 and the drive axle 14 can then be produced via the shifting element 7 assigned to the component transmission 5, which has the relatively high transmission ratio.

A torque reserve held at the electric drive device 15 can be eliminated by the described methods for re-starting the internal combustion engine 2, with the result that the entire torque of the electric drive device 15 is available for meeting the driver's request, i.e. for accelerating the motor vehicle.

To increase the dynamics of the re-starting of the internal combustion engine 2 it is possible, with the methods described above, to select a value for the pre-selected torque of the internal combustion engine 2 that is higher than that of the determined driver's request torque, that is to say a torque that is set via an accelerator pedal, as a result of which the revving up of the internal combustion engine 2 is accelerated and the desired target rotational speed is reached more quickly. When the rotational speed of the internal combustion engine 2 is adjusted to the desired target rotational speed, this torque of the internal combustion engine 2 can be adjusted to the driver's request torque that is set via the accelerator pedal.

In a cold start, the internal combustion engine 2 is started when the motor vehicle is stationary. The cold start is carried out by a gear speed not being engaged in one of the two component transmissions 5 or 6. In the present case, for example, the second component transmission 6 is not engaged and the associated second shifting element 8 is closed. A gear speed with the highest possible transmission ratio, i.e. the lowest possible gear speed, is engaged at the first component transmission 5. The second shifting element 8 is opened after the internal combustion engine 2 starts, and a suitable starting gear speed is engaged in the second component transmission 6. The starting gear speed may be either a forward gear speed or a reverse gear speed. The starting then is carried out optionally via the second shifting element 8 or the first shifting element 7. The necessary starting torque of the internal combustion engine 2 is applied completely by the electric drive device 15. A push start can be carried out if the torque of the electric drive device 15 is not sufficient for a cold start for reasons of configuration of the drive system 1. In this context, the second shifting element 8 is opened, a rotational impulse is built up by accelerating the electric drive device 15, and the second shifting element 8 is closed to use this rotational impulse and the entire torque of the electric drive device 15 for cold-starting the internal combustion engine 2. Starting optionally can be carried out via the second shifting element 8 or the first shifting element 7. If starting is performed with the second shifting element 8, the shifting element must be opened beforehand and a starting gear speed engaged in the second component transmission 6. To shorten the starting time, it is also possible to start via the first shifting element 7. In this case, a starting gear speed is engaged in the first component transmission 5 simultaneously, and the starting gear speed simultaneously is assisted by the second shifting element 8.

A starter (not illustrated) can be provided for the internal combustion engine 2 If the torque of the electric drive device 15 is not sufficient to start the internal combustion engine 2.

If the motor vehicle equipped with the drive system 1 is operated downhill, particularly on a pronounced slope, i.e. on a slope with a large gradient, the state may arise in which despite a maximum regenerative torque generated in the electric drive device 15, the motor vehicle is continuously accelerated and the rotational speed of the electric drive device 15 possibly approaches a limiting rotational speed at which there is a risk of damage to the electric drive device 15. In this case, the transmission 4 is shifted so that the drive axle 14 is connected to the electric drive device 15 via relatively low transmission ratio of the transmission 4 to reduce the rotational speed of the electric drive device 15. The internal combustion engine 2 can be connected to the drive axle 14 by one of the two shifting elements 7 or 8, and therefore via one of the two component transmissions 5 or 6, to ensure that the driver of the motor vehicle equipped with the drive system 1 does not have to apply a large force to the brake pedal to bring about a constant braking effect at the wheels of the drive axle 14 during the shifting process and in the event of a possibly increased deceleration requirement. In this context, the internal combustion engine 2 is not energized and only the internal friction thereof is used as an additional braking torque for the drive axle 14. Here, the shifting element 8 or 7 of the other component transmission 6 or 5 produces a connection between the drive axle 14 and the internal combustion engine 2 at one of the two component transmissions 5 or 6 during the shifting process.

To connect the internal combustion engine 2 to the at least one drive axle 14, in the present case the manual transmission 7 or 8 of that component transmission 5 or 6 in which the relatively high transmission ratio, that is to say the lower gear speed, is engaged is firstly connected to the internal combustion engine 2. In the present case, it is assumed that in the first component transmission 5 the sixth gear speed is engaged, and in the second component transmission 6 the fifth gear speed is engaged. In this case, the shifting element 8 therefore first is connected to the internal combustion engine 2, as a result of which the internal combustion engine 2 is connected to the drive axle 14 via the more rapidly rotating, second input shaft 10. The internal combustion engine 2 then is tow-started, i.e. changed from its stationary state to a certain rotational speed, by means of the shifting element 8. After a desired target rotational speed, which has been set via the slip of the shifting element 8, has been reached, the shifting element 7 of the component transmission 5 is connected to the internal combustion engine 2, with the result that the internal combustion engine 2 is connected to the drive axle 14 via the first input shaft 9 at a relatively low rotational speed, of the first component transmission 5 in which the relatively low transmission ratio is engaged. In this way, the internal combustion engine 2 can therefore be adjusted to the desired rotational speed, and then connected to the component transmission 5 which offers the greater braking torque in the present example. Of course, reversed actuation of the two shifting elements 7 and 8 is also possible if, for example, a lower gear speed, i.e. a higher transmission ratio, is engaged in the first component transmission 5 than in the second component transmission 6.

The method described above can be used in such a way that at speeds of the motor vehicle below a defined limiting speed the electric drive device 15 is used to start the internal combustion engine 2, and that at speeds of the motor vehicle above the limiting speed the internal combustion engine 2 is started via the drive axle 14, i.e. when the limiting speed is exceeded the kinetic energy of the motor vehicle is used to start the internal combustion engine 2. When the limiting speed is undershot, the internal combustion engine 2 is started via the electric drive device 15 in order to avoid adverse effects on comfort.

Figure 7:
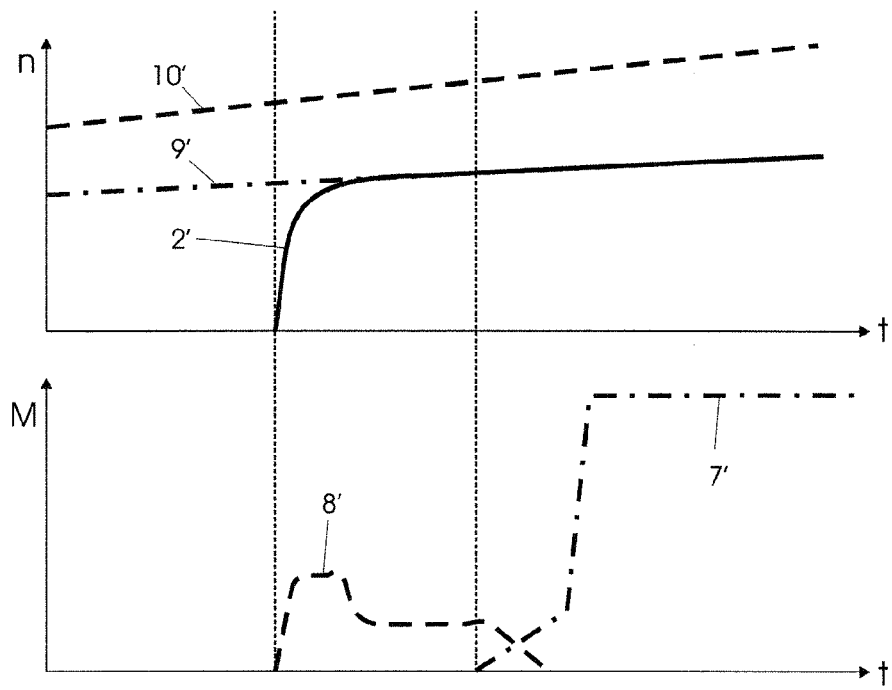
FIG. 7 is a diagram which shows the sequence of a further part of the method according to the invention.

FIG. 7 is a diagram illustrating this procedure for connecting the internal combustion engine 2 to the drive axle 14 by means of one of the two shifting elements 7 or 8 and therefore via one of the two component transmissions 5 or 6. In this context, the reference symbols 2', 9', 10', 7' and 8' which are associated with the respective element are respectively assigned, against the time, to the different profiles of the rotational speeds n of the internal combustion engine 2 and of the two input shafts 9 and 10 as well as the torques M present at the two shifting elements 7 and 8.

To be able to determine the drag torque of the internal combustion engine 2, before the above-described method of connecting the internal combustion engine 2 to the drive axle 14 in an operating state in which the internal combustion engine 2 has reached a certain rotational speed at least approximately constantly during its connection to the shifting element 8 of the second component transmission 6, the drag torque which is generated by the internal combustion engine 2 is compared to a torque of the shifting element 8, connected to the internal combustion engine 2, of the second component transmission 6. If stable rotational speed conditions prevail during this comparison, the torque which is present or set at the shifting element 8 corresponds to the current drag torque of the internal combustion engine 2. In this context, the torque which is present at the shifting element 8 can be measured with a sensor 19 which is connected to the shifting element 8. Such a sensor 19 can already be integrated into the shifting element 8.

With this method it is therefore possible to determine the drag torque of the internal combustion engine 2 and use it for the transfer of the torque to the shifting element 7 which takes place subsequent to the adaptation phase, that is to say to the phase in which the torque comparison described above takes place. Furthermore, it is possible to store the determined drag torque of the internal combustion engine 2 by means of, for example, a corresponding control device 20 in a characteristic diagram 21. The determination of the drag torque of the internal combustion engine 2 can be repeated regularly since said drag torque can change considerably over the running time of the internal combustion engine 2. The target rotational speed closed-loop control, described above, of the internal combustion engine 2 can likewise be carried out with this control device 20.

Figure 8:
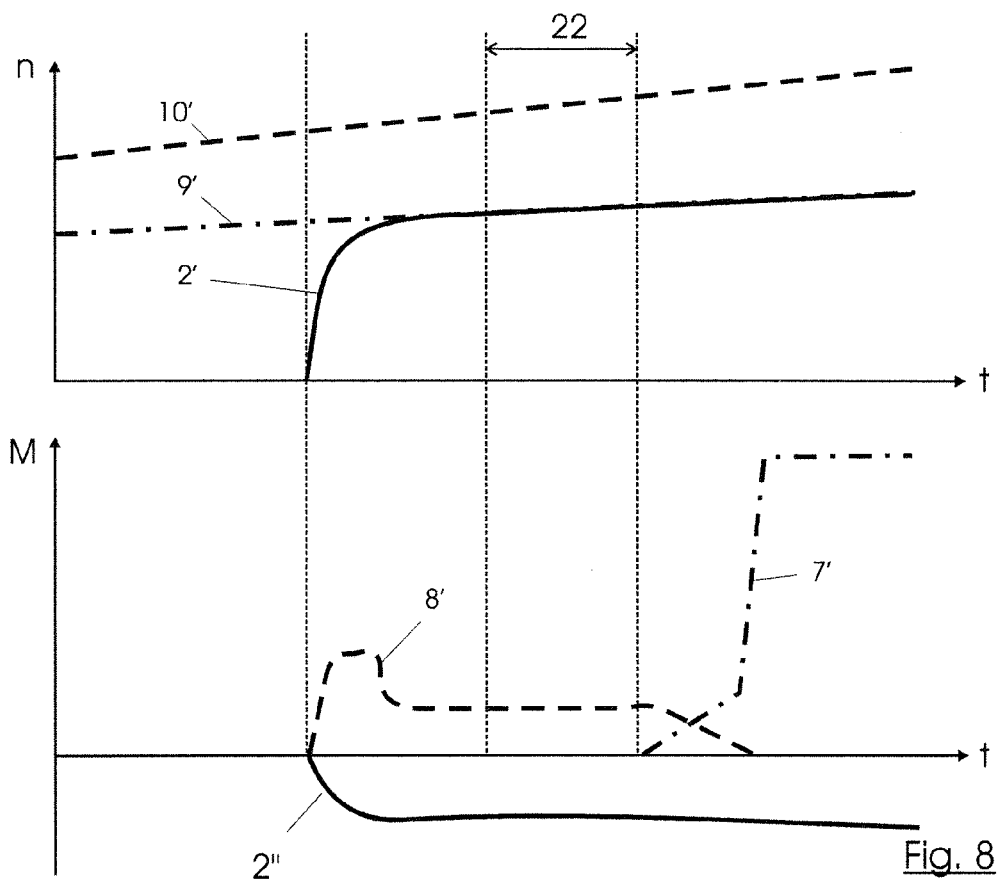
FIG. 8 illustrates the method of FIG. 7 together with a method for determining the drag torque of the internal combustion engine.

FIG. 8 illustrates the method described above with reference to FIG. 7, together with the method for determining the drag torque of the internal combustion engine 2, wherein, in addition to the illustration according to FIG. 7, the adaptation phase in which the drag torque of the internal combustion engine 2 is determined is denoted by the reference symbol 22, and the profile of the drag torque of the internal combustion engine 2 is denoted by the reference symbol 2". In this context it is apparent that, as a result of the adaptation phase 22, a relatively long time period is required for the transfer of the connection between the internal combustion engine 2 and the drive axle 14 via the shifting element 8 of the second component transmission 6 to the connection via the shifting element 7 of the first component transmission 5, but since the entire method is a deceleration method, this shifted timing and the possibly associated loss of dynamics is irrelevant.

During all the processes explained above, closed-loop and/or open-loop control of the electric drive device 15 can be carried out by means of a corresponding closed-loop and/or open-loop control device 23 in such a way that no undesirable changes in acceleration occur for the motor vehicle, which can comprise, for example, compensation of the torques which are set at the shifting elements 7 and 8 and/or a rotational speed closed-loop control of one of the input shafts 9 or 10 of the transmission 4.

To avoid an excessively large number of shifting processes in a state in which the motor vehicle is on a slope, for example when it stops when traveling downhill, in this state detection of the gradient of the slope can be carried out and a suitable transmission ratio can be engaged in the transmission 4 as a function of the detected slope. Since the engaged transmission ratio should be as small as possible in order to avoid reaching a limiting rotational speed of the electric drive device 15 early, a relatively small transmission ratio is engaged when a relatively severe slope is detected, and a relatively large transmission ratio is engaged when a relatively gentle slope is detected. The detection of the size of the slope, i.e. the magnitude of the gradient thereof, can be carried out, for example, by means of one or more acceleration sensors which can be present on a series-manufactured basis on the motor vehicle.

What is claimed is:

1. A method for operating a drive system for a motor vehicle that has an electric drive device, an internal combustion engine and a transmission connected to the internal combustion engine, the transmission having at least two component transmissions on which different transmission ratios can be selected at the same time, each component transmission having a shifting element for connecting the component transmission to the internal combustion engine, the internal combustion engine and the electric drive device being connected to the transmission so that a torque can be transmitted from the electric drive device and the internal combustion engine to at least one drive axle of the motor vehicle, and a torque can be transmitted from the at least one drive axle to the electric drive device and the internal combustion engine, the internal combustion engine being adjustable from a deactivated state to an energized state, the method comprising:

transmitting a torque to the internal combustion engine by the drive axle or the electric drive device via one of the two shifting elements to increase the rotational speed of the internal combustion engine;

adjusting the internal combustion engine to a target rotational speed via one of the two shifting elements; and connecting the internal combustion engine and the drive axle via one of the two shifting elements when the target rotational speed is reached.

2. The method of claim 1, further comprising: starting the internal combustion engine by the shifting element assigned to the component transmission having a relatively low transmission ratio; adjusting to the target rotational speed by the shifting element assigned to the component transmission having a relatively low transmission ratio; and connecting the internal combustion engine and the drive axle via the shifting element assigned to the component transmission having the relatively high transmission ratio.

3. The method of claim 2, wherein, the connecting to the internal combustion engine via the shifting element assigned to the component transmission having the relatively low transmission ratio is interrupted before the rotational speed of the component transmission with the relatively low transmission ratio is reached, and the shifting element assigned to the component transmission having the relatively high transmission ratio is connected to the internal combustion engine after the rotational speed of the component transmission with the relatively low transmission ratio has been exceeded.

4. The method of claim 3, wherein when the rotational speed of the component transmission having the high transmission ratio is exceeded, the rotational speed of the internal combustion engine is adjusted by reducing the rotational speed of the internal combustion engine to the target rotational speed by using the shifting element assigned to the component transmission with the low transmission ratio.

5. The method of claim 1, further comprising starting the internal combustion engine by the shifting element assigned to the component transmission having the relatively high transmission ratio, adjusting to the target rotational speed by the shifting element assigned to the component transmission having the relatively low transmission ratio; and connecting the internal combustion engine and the drive axle via the shifting element which is assigned to the component transmission having the relatively high transmission ratio.

6. The method of claim 1, further comprising starting the internal combustion engine by the shifting element assigned to the component transmission having the relatively high transmission ratio; adjusting to the target rotational speed by the shifting element assigned to the component transmission having the relatively high transmission ratio and connecting the internal combustion engine and the drive axle via the shifting element assigned to the component transmission having the relatively low transmission ratio.

7. The method of claim 1, further comprising modulating the torque transmitted to the internal combustion engine by at least one of the shifting elements by at least one actuator assigned to the respective shifting element.

8. The method of claim 1, further comprising using an additional starting device to start the internal combustion engine at speeds of the motor vehicle below a limiting speed and starting the internal combustion engine via the drive axle at speeds of the motor vehicle above the limiting speed.

9. The method of claim 1, further comprising performing closed-loop and/or open-loop control of the electric drive device by a closed-loop and/or open-loop control device.

10. The method of claim 1, characterized wherein the internal combustion engine is adjusted to a higher torque than a desired torque that has been set via an accelerator pedal.

* * * * *